United States Patent
Yamaguchi

(10) Patent No.: US 9,160,234 B2
(45) Date of Patent: Oct. 13, 2015

(54) SWITCHING POWER SUPPLY APPARATUS

(71) Applicant: Murata Manufacturing Co., Ltd., Nagaokakyo-shi, Kyoto-fu (JP)

(72) Inventor: Naoki Yamaguchi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 78 days.

(21) Appl. No.: 13/832,772

(22) Filed: Mar. 15, 2013

(65) Prior Publication Data

US 2013/0250625 A1    Sep. 26, 2013

(30) Foreign Application Priority Data

Mar. 26, 2012   (JP) .................................. 2012-068573

(51) Int. Cl.
*H02M 3/335* (2006.01)
*H02M 1/42* (2007.01)
*H02M 1/00* (2007.01)

(52) U.S. Cl.
CPC ........ *H02M 3/33507* (2013.01); *H02M 1/4258* (2013.01); *H02M 3/33569* (2013.01); *H02M 2001/0058* (2013.01); *Y02B 70/126* (2013.01); *Y02B 70/1491* (2013.01)

(58) Field of Classification Search
USPC ........ 363/16, 18, 19, 20, 21.01, 21.02, 21.03, 363/56.01
See application file for complete search history.

(56) References Cited

U.S. PATENT DOCUMENTS

| 6,201,713 | B1 | 3/2001 | Hosotani | |
|---|---|---|---|---|
| 6,690,586 | B2 * | 2/2004 | Hosotani et al. | ................. 363/19 |
| 7,778,048 | B2 * | 8/2010 | Hosotani | .................... 363/21.02 |
| 2002/0075085 | A1 | 6/2002 | Nishida et al. | |
| 2002/0101742 | A1 | 8/2002 | Hosotani et al. | |
| 2003/0142521 | A1 | 7/2003 | Hosotani et al. | |
| 2006/0062024 | A1 | 3/2006 | Hosotani et al. | |
| 2009/0316444 | A1 | 12/2009 | Yamaguchi et al. | |
| 2012/0314458 | A1 | 12/2012 | Hosotani et al. | |

FOREIGN PATENT DOCUMENTS

| JP | 2000-209850 A | 7/2000 |
|---|---|---|
| JP | 2000-308345 A | 11/2000 |
| JP | 2001-037220 A | 2/2001 |
| JP | 2002-112544 A | 4/2002 |

(Continued)

OTHER PUBLICATIONS

Official Communication issued in corresponding Chinese Patent Application No. 201310093568.8, mailed on Feb. 28, 2015.

*Primary Examiner* — Nguyen Tran
(74) *Attorney, Agent, or Firm* — Keating & Bennett, LLP

(57) ABSTRACT

In a switching power supply apparatus, a low-side switching device is connected in series with a primary winding. A high-side switching device and the primary winding define a closed loop. A voltage induced in a high-side drive winding is applied to the high-side switching device to turn on the high-side switching device. A transistor, which is turned on/off in accordance with the voltage across a capacitor charged by the voltage induced in the high-side drive winding, is connected to the gate terminal of the high-side switching device. When the capacitor is charged and the transistor is turned on, the high-side switching device is turned off. The capacitor is discharged by the voltage induced in the high-side drive winding, during the ON period of the low-side switching device.

18 Claims, 6 Drawing Sheets

(56) References Cited

FOREIGN PATENT DOCUMENTS

| | | |
|---|---|---|
| JP | 2002-136120 A | 5/2002 |
| WO | 2005/074113 A1 | 8/2005 |
| WO | 2009/025157 A1 | 2/2009 |
| WO | 2011/105258 A1 | 9/2011 |

* cited by examiner

SWITCHING POWER SUPPLY APPARATUS

BACKGROUND OF THE INVENTION

1. Field of the Invention

The present invention relates to a switching power supply apparatus that includes a transformer and two switching devices.

2. Description of the Related Art

Japanese Unexamined Patent Application Publication No. 2001-37220 discloses a switching power supply apparatus having a configuration in which two switching devices are alternately switched on/off in a complementary manner. The switching power supply apparatus disclosed in Japanese Unexamined Patent Application Publication No. 2001-37220 includes a flyback converter and two switching devices, i.e., high-side and low-side switching devices (FETs). During an ON period of the low-side FET, energy is stored in a transformer, and the energy stored in the transformer is supplied to a load during an OFF period of the low-side FET. The switching power supply apparatus disclosed in Japanese Unexamined Patent Application Publication No. 2001-37220 uses an active clamp method in which a surge voltage applied to the low-side FET is clamped, and a zero-voltage switching operation of the two switching devices is achieved.

In this switching power supply apparatus, the low-side FET, the primary winding of the transformer, and a DC power supply are connected in series with one another, and a series circuit including the high-side FET and a capacitor is connected between the two ends of the primary winding of the transformer. The transformer of the switching power supply apparatus includes first and second drive windings, and one end of the first drive winding is connected to a low-side switching control circuit. The low-side switching control circuit outputs a control signal to the gate of the low-side FET. The source of the high-side FET is connected to the drain of the low-side FET. A high-side switching control circuit includes a time constant circuit including a capacitor and a resistor.

The switching power supply apparatus disclosed in Japanese Unexamined Patent Application Publication No. 2001-37220 is configured such that the high-side FET is driven by the second drive winding of the transformer and the time constant circuit. However, when a PFC converter is provided or a DC-DC converter which also functions as a PFC converter is provided, the low-side FET needs to be switched on/off in accordance with variations in the input voltage so as to improve a power factor. In this case, in the switching power supply apparatus disclosed in Japanese Unexamined Patent Application Publication No. 2001-37220, since an ON period of the high-side FET is substantially fixed by the time constant circuit, it is difficult to enable the changing of the ON period of the high-side FET. On the other hand, in order to efficiently drive the FETs, the high-side FET may be controlled in accordance with ON/OFF operations of the low-side FET by including a driver IC in the high-side switching control circuit. However, a reduction in cost is difficult to achieve in this case.

SUMMARY OF THE INVENTION

Preferred embodiments of the present invention provide a switching power supply apparatus that efficiently controls two switching devices in accordance with variations in an input voltage while preventing an increase in cost.

A switching power supply apparatus according to a preferred embodiment of the present invention includes a power supply input portion to which an input voltage is input; a transformer including a primary winding, a secondary winding, and a drive winding magnetically coupled to one another; a low-side switching device that is connected in series with the primary winding and that is turned on and off such that the input voltage is intermittently applied to the primary winding; a resonant capacitor, a resonant inductor, and a high-side switching device connected across the primary winding so as to define a closed loop; a first control circuit arranged to control the low-side switching device; and a second control circuit arranged to control the high-side switching device in accordance with a voltage generated in the drive winding.

The second control circuit includes a first capacitor that is connected between the drive winding and a control terminal of the high-side switching device and that is charged during an ON period of the low-side switching device; a second capacitor connected to a connection node between the first capacitor and the drive winding; a charging circuit that is connected between the second capacitor and a connection node between the high-side switching device and the first capacitor and that charges the second capacitor based on voltages of the drive winding and the first capacitor during an OFF period of the low-side switching device; a turn-off circuit that is connected to the control terminal of the high-side switching device and that turns off the high-side switching device when a voltage across the second capacitor exceeds a threshold value; and a discharging circuit that is connected between the second capacitor and a connection node between the high-side switching device and the drive winding and that discharges the second capacitor during an ON period of the low-side switching device.

With this configuration, the first control circuit performs switching control of the low-side switching device, and the second control circuit performs switching control of the high-side switching device. The second control circuit adds a voltage across the first capacitor charged during the ON period of the low-side switching device to a voltage induced in the drive winding, and turns off the high-side switching device. At this time, the second capacitor is charged by the charging circuit. When the voltage polarity of the drive winding is inverted, the discharging circuit discharges the second capacitor and the turn-off circuit turns off the high-side switching device.

In this manner, in the switching power supply apparatus according to a preferred embodiment of the present invention, two switching devices can be turned on and off in a complementary manner with a dead time between the switching operations. Thus, the two switches are prevented from being turned on at the same time, so as to prevent an arm short circuit or damage to the switching devices. In addition, since the second capacitor is charged and discharged in accordance with a change in the input voltage, the ON period of the high-side switching device can be changed in accordance with variations in the input voltage. Further, since the high-side switching device and the low-side switching device can operate under zero voltage switching even when the input voltage changes, a low-noise high-efficiency operation is possible.

A configuration may preferably be provided in which an AC input voltage is input to the power supply input portion, the switching power supply apparatus further includes a rectifying circuit that performs full-wave rectification for the AC input voltage, and the first control circuit detects a control voltage corresponding to a voltage obtained through the full-wave rectification performed by the rectifying circuit, and controls the low-side switching device based on the control voltage.

With this configuration, by performing switching control of the low-side switching device using a control voltage corresponding to an AC input voltage, an operation with an improved power factor is achieved.

It is preferable that the resonant inductor is a leakage inductance of the transformer.

With this configuration, since an inductor as a separate component is not required, a reduction in the number of components is achieved.

It is preferable to provide a configuration in which the charging circuit includes a first constant-voltage device that sets a level of a charging current to charge the second capacitor, and the discharging circuit includes a second constant-voltage device that sets a level of a discharging current to discharge the second capacitor.

With this configuration, since the amounts of charging and discharging of the second capacitor can be further adjusted, a high-efficiency operation is achieved using a small number of inexpensive components. Further, even when a voltage generated in the drive winding changes due to a change in the specifications of the winding of the transformer, the amounts of charging and discharging of the second capacitor can be further adjusted using the constant-voltage devices so as to enable optimal design.

The discharging circuit may preferably include a third capacitor and a rectifying device connected in parallel with each other.

With this configuration, since the amount of discharging of the second capacitor can be instantly increased, the amount of change in the ON period of the high-side switching device is effectively controlled.

The discharging circuit may preferably be connected between the second capacitor and a connection node between the first capacitor and the high-side switching device, and may discharge the second capacitor in addition to the first capacitor.

With this configuration, since a voltage applied to the discharging circuit can be decreased in accordance with the amount of charge stored in the first capacitor, the breakdown voltages and losses of the components of the discharging circuit are significantly reduced.

According to various preferred embodiments of the present invention, the ON period of the high-side switching device is effectively changed in accordance with variations in an input voltage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
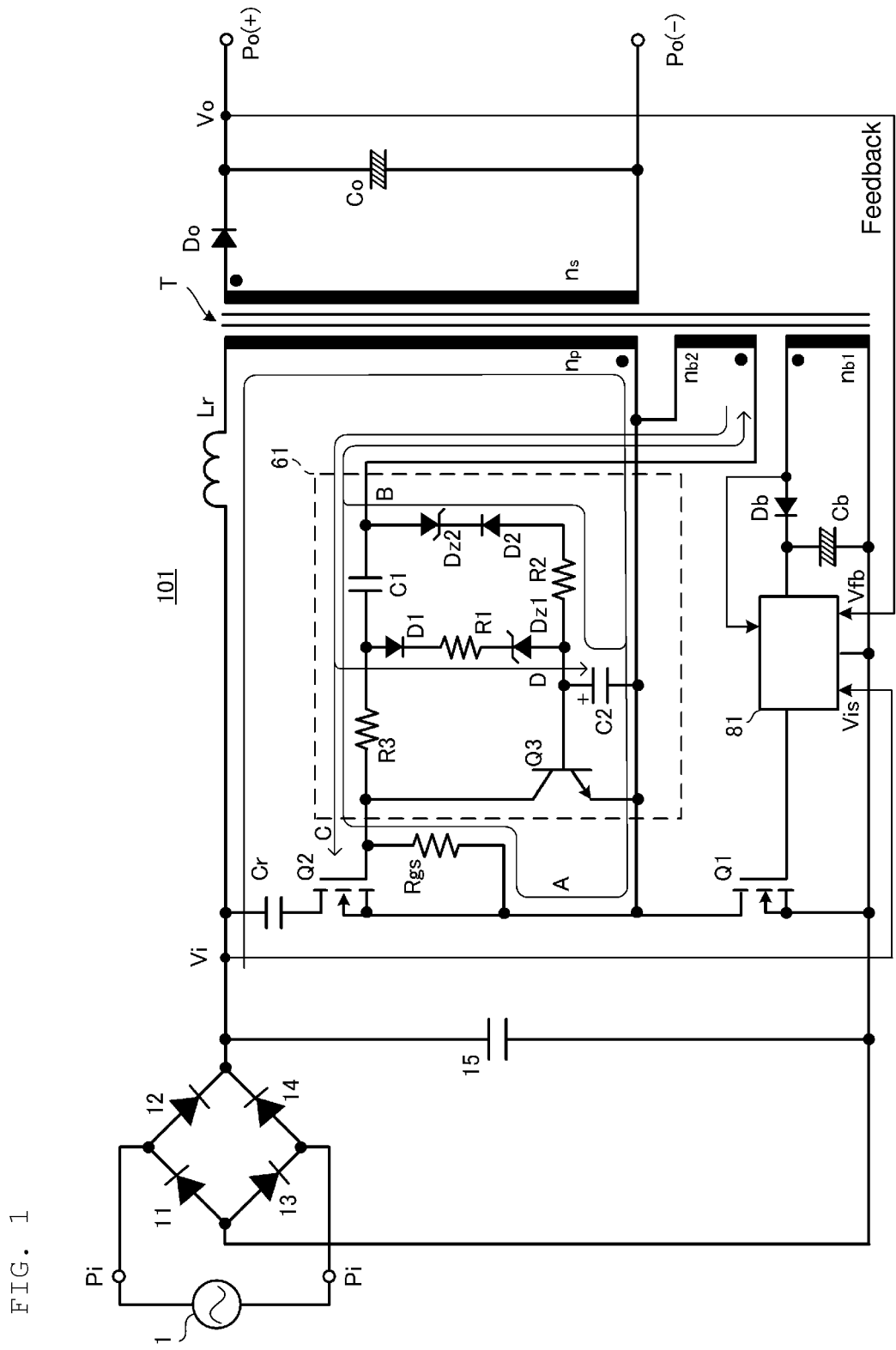
FIG. 1 is a circuit diagram of a switching power supply apparatus according to a first preferred embodiment of the present invention.

FIG. 1 is a circuit diagram of a switching power supply apparatus according to a first preferred embodiment of the present invention. A switching power supply apparatus 101 according to the first preferred embodiment includes a one-converter system in which voltage conversion using a transformer T is performed and power factor improvement is achieved at the same time.

A diode bridge circuit (rectifying circuit) including diodes 11, 12, 13, and 14 and a filter capacitor 15 are connected between input terminals Pi and Pi of the switching power supply apparatus 101. An AC input power supply 1 is connected to the diode bridge circuit, and the diode bridge circuit performs full wave rectification for an AC input voltage supplied from the AC input power supply 1. Hereinafter, a voltage after rectification is denoted as an input voltage Vi. A load (not illustrated) is connected between output terminals Po(+) and Po(−), and the switching power supply apparatus 101 outputs a predetermined DC voltage (output voltage) Vo to the load.

A primary winding np of the transformer T and a low-side switching device Q1 are connected in series so as to define a first series circuit. The low-side switching device Q1 is an n-type FET, the drain terminal of which is connected to the primary winding np of the transformer T and the source terminal of which is connected to a ground line.

Between the two ends of the primary winding np of the transformer T, a second series circuit is provided in which a high-side switching device Q2, a resonant capacitor Cr, and a resonant inductor Lr are connected in series. The high-side switching device Q2 is preferably an n-type FET, for example, the source terminal of which is connected to a connection node between the low-side switching device Q1 and the primary winding np. Note that the resonant inductor Lr preferably represents a leakage inductance of the transformer T and defines, together with the resonant capacitor Cr, a resonant circuit. Alternatively, the resonant inductor Lr may by an inductor which is an independent component different from the transformer T.

Between the two ends of a secondary winding ns of the transformer T, a half-wave rectifying and smoothing circuit which includes a diode Do and a capacitor Co is provided. The rectifying and smoothing circuit performs half-wave rectification for an AC voltage output from the secondary winding ns and outputs the rectified voltage to the output terminals Po(+) and Po(−).

The transformer T includes a low-side drive winding nb1 and a high-side drive winding nb2 on the primary side. A low-side control circuit 81 (first control circuit), which performs switching control of the low-side switching device Q1, is connected to the low-side drive winding nb1. A rectifying and smoothing circuit including a diode Db and a capacitor Cb is connected between the low-side drive winding nb1 and the low-side control circuit 81, and a DC voltage obtained by the rectifying and smoothing circuit is supplied to a low-side control circuit 81 as a power supply voltage.

The low-side control circuit 81 applies a control voltage to the gate terminal (control terminal) of the low-side switching device Q1, and performs on/off control of the low-side switching device Q1. Hereinafter, the switching control of the low-side switching device Q1 performed by the low-side control circuit 81 will be described in more detail. A feedback circuit is connected between the low-side control circuit 81 and the output terminals Po(+) and Po(−), and a feedback voltage Vfb in accordance with the output voltage Vo is input to the low-side control circuit 81. Note that, in FIG. 1, only a feedback path is illustrated as a single line (denoted by Feedback) for simplicity. For example, feedback may preferably be provided by an insulating device, such as a photocoupler or a pulse transformer. Specifically, the feedback circuit generates a feedback signal based on a comparison of a divided voltage of the voltage between the output terminals Po(+) and Po(−) with a reference voltage, and inputs a feedback voltage Vfb to the low-side control circuit 81 in an insulated manner.

An input voltage Vi is input to the low-side control circuit 81. Although illustrated in a simplified manner in FIG. 1, specifically, a detection signal (resistor-divided signal) Vis that monitors the waveform of the input voltage Vi is input to the low-side control circuit 81.

When the voltage polarity inversion of the transformer T is detected using the low-side drive winding nb1, the low-side control circuit 81 outputs a control voltage to turn on the low-side switching device Q1. Then, in accordance with the feedback voltage Vfb and the resistor-divided voltage Vis, the low-side control circuit 81 controls the ON period of the low-side switching device Q1. In more detail, the low-side control circuit 81 generates a control voltage by multiplying the feedback voltage Vfb by the resistor-divided voltage Vis. The low-side control circuit 81 turns on the low-side switching device Q1 for a predetermined period by applying the generated control voltage to the gate terminal of the low-side switching device Q1.

A first end of the high-side drive winding nb2 of the transformer T is connected to a connection node between the low-side switching device Q1 and the high-side switching device Q2 (that is, connected to the source terminal of the high-side switching device Q2). The second end of the high-side drive winding nb2 is connected to the gate terminal of the high-side switching device Q2 through a high-side control circuit 61 (second control circuit).

A resistor Rgs is connected between the gate and source of the high-side switching device Q2. The resistor Rgs is provided to adjust the voltage applied between the gate and source of the high-side switching device Q2 or to discharge a residual electric charge stored in the capacitance between the gate and source of the high-side switching device Q2.

The high-side control circuit 61 includes a series circuit including a capacitor C1 (first capacitor) and a resistor R3 connected between the first end of the high-side drive winding nb2 and the gate terminal of the high-side switching device Q2. Further, the high-side control circuit includes a transistor Q3 (turn-off circuit) connected between the gate and source of the high-side switching device Q2. The collector terminal of the transistor Q3 is connected to the gate terminal of the high-side switching device Q2 and the emitter terminal is connected to the source terminal of the high-side switching device Q2.

A capacitor C2 (second capacitor) is connected between the base and emitter of the transistor Q3. The capacitor C2 is charged and discharged by a charging circuit and a discharging circuit, described later, connected to the capacitor C1. When the capacitor C2 is charged by the charging circuit and the voltage across the capacitor C2 reaches a threshold voltage between the base and emitter of the transistor Q3, the transistor Q3 is turned on. When the capacitor C2 is discharged by the discharging circuit and the voltage across the capacitor C2 goes below the threshold voltage between the base and emitter of the transistor Q3, the transistor Q3 is turned off. In other words, the transistor Q3 is turned on/off in accordance with the voltage across the capacitor C2.

The above-described charging circuit is defined by a series circuit including a diode D1, a resistor R1, and a Zener diode Dz1 (first constant-voltage device). In the switching power supply apparatus 101, the anode terminal of the diode D1 is connected to a connection node between the capacitor C1 and the resistor R3, and the cathode terminal is connected to the cathode terminal of the Zener diode Dz1 through the resistor R1. The anode terminal of the Zener diode Dz1 is connected to the capacitor C2. In other words, the diode D1 and the Zener diode Dz1 preferably have opposite rectification directions. With this series circuit, a charging current (having a certain level) flows through the capacitor C2 in accordance with a voltage induced in the high-side drive winding nb2 and a voltage across the charged capacitor C1 such that the capacitor C2 is charged. Hereinafter, the direction in which the charging current flows is denoted as a positive direction. By determining the Zener voltage of the Zener diode Dz1 in accordance with the voltage induced in the high-side drive winding nb2, the capacitor C2 can be charged in a stable manner.

The discharging circuit is defined by a series circuit including a diode D2, a resistor R2, and a Zener diode Dz2 (second constant-voltage device). In the switching power supply apparatus 101, the anode terminal of the diode D2 is connected to the capacitor C2 through the resistor R2, and the cathode terminal of the diode D2 is connected to the cathode terminal of the Zener diode Dz2. The anode terminal of the Zener diode Dz2 is connected to a connection node between the capacitor C1 and the high-side drive winding nb2. In other words, the diode D2 and the Zener diode Dz2 preferably have opposite rectification directions. The diode D1 of the charging circuit described before and the diode D2 of the discharging circuit are connected to the capacitor C2 so as to be oriented in opposite directions. With this series circuit, a discharging current (having a certain level) flows in the negative direction through the capacitor C2 due to a voltage induced in the high-side drive winding nb2 such that the capacitor C2 is discharged. By determining the Zener voltage of the Zener diode Dz2 in accordance with the voltage induced in the high-side drive winding nb2, the capacitor C2 can be discharged in a stable manner.

Figure 2:
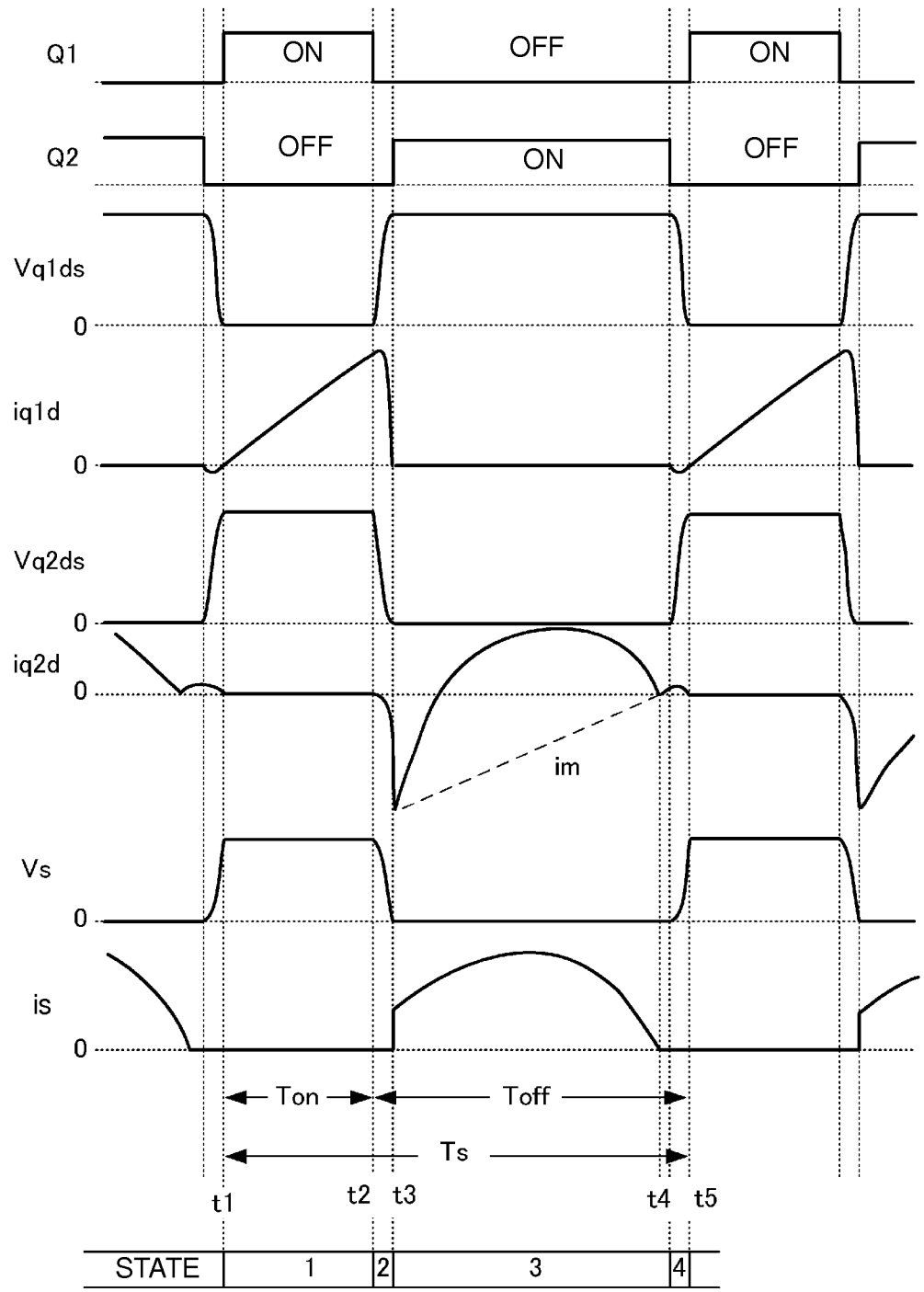
FIG. 2 is a diagram illustrating operation waveforms in main portions of a switching power supply apparatus.

Hereinafter, the operation of the switching power supply apparatus 101 will be described. FIG. 2 is a diagram illustrating operation waveforms in main portions of the switching power supply apparatus 101. In FIG. 2, Vq1$ds$ denotes a voltage between the drain and source of the low-side switching device Q1 and iq1$d$ denotes a drain current of the low-side switching device Q1. Vq2$ds$ denotes a voltage between the drain and source of the high-side switching device Q2, and iq2$d$ denotes a drain current of the high-side switching device Q2. Vs denotes a voltage across the diode Do on the secondary side of the transformer T, and isc denotes a current flowing through the diode Do.

The switching operation of the circuit after activation can be primarily divided into four operation states from time t1 to time t5 during a single period Ts. First, the operation at the time of activation (when oscillation starts) will be described, followed by the description of each state.

When the low-side control circuit 81 detects the voltage polarity inversion of the transformer T using the low-side drive winding nb1, the low-side control circuit 81 applies a voltage to the gate terminal of the low-side switching device Q1. As a result, the low-side switching device Q1 is turned on.

In state 1, the low-side switching device Q1 is in an ON state. The input voltage Vi is applied to the primary winding np of the transformer T, the primary winding current increases linearly or substantially linearly, and excitation energy is stored in the transformer T. The waveform of the drain current iq1d of the low-side switching device Q1 is the waveform of a primary winding current which linearly or substantially linearly increases. Since the low-side switching device Q1 is in the ON state, a voltage Vq1ds between the drain and source of the low-side switching device Q1 is substantially zero. On the secondary side of the transformer T, a voltage is induced in the secondary winding ns in a direction which causes the diode Do be reverse biased.

At this time, a voltage in accordance with the input voltage Vi is induced in the high-side drive winding nb2 of the transformer T. This voltage causes a current A to flow through the following path: the resistor Rgs→the resistor R3→the capacitor C1→the high-side drive winding nb2 so as to charge the capacitor C1. At the same time, a discharging current B flows in the negative direction through the following path: the capacitor C2→the resistor R2→the diode D2→the Zener diode Dz2→the high-side drive winding nb2 so as to discharge the capacitor C2.

The low-side control circuit 81 controls the ON period of the low-side switching device Q1 based on the feedback voltage Vfb and the resistor-divided voltage Vis, and turns off the low-side switching device Q1 at time t2. This results in a transition from state 1 to state 2.

When the low-side switching device Q1 is turned off, the current which was flowing through the primary winding np flows through a body diode (not illustrated) of the high-side switching device Q2 so as to charge the resonant capacitor Cr. At this time, resonance between the resonant inductor Lr and the resonant capacitor Cr occurs. As a result of this resonance, the falling edges of the voltage Vq2ds and the drain current iq2d of the high-side switching device Q2 substantially become portions of sine waves generated by the resonance. The rising edge of the voltage Vq1ds of the low-side switching device Q1 and the falling edge of the drain current iq1d of the low-side switching device Q1 in state 2 substantially become portions of sine waves generated by the resonance between the parasitic capacitance of the low-side switching device Q1 and the primary winding np.

When the low-side switching device Q1 is turned off at time t2, the voltage across the charged capacitor C1 is added to the voltage induced in the high-side drive winding nb2, a current C flows through the following path: the capacitor C1→the resistor R3, and a voltage is applied to the gate terminal of the high-side switching device Q2 slightly later than the turning off of the low-side switching device Q1. At this time, the drain current iq2d of the high-side switching device Q2 is a negative current, and the current is flowing through the body diode (not illustrated). As a result, the high-side switching device Q2 is turned on at time t3 through a zero-voltage switching (ZVS) operation. At the same time, a charging current D flows in the positive direction through a path: the diode D1→the resistor R1→the Zener diode Dz1 so as to charge the capacitor C2. The charging current D that flows at this time changes in accordance with the voltage across the charged capacitor C1.

On the secondary side of the transformer T, the voltage Vs across the two ends of the diode Do provides a forward bias, such that the diode Do is brought into conduction. The curve of the falling edge of the voltage Vs is substantially a portion of a sine wave generated by the resonance between the parasitic capacitance of the diode Do and the secondary winding ns.

In state 3, the high-side switching device Q2 is brought into conduction and resonance between the resonant inductor Lr and the resonant capacitor Cr begins. During this period, the electric charge stored in the resonant capacitor Cr is discharged. At this time, the diode Do is brought into conduction on the secondary side of the transformer T, and the excitation energy stored in the transformer T and the electrostatic energy stored in the resonant capacitor Cr are released from the secondary winding ns and are output from the output terminals Po(+) and Po(−) through the rectifying and smoothing circuit.

At this time, the waveform of the drain current iq2d of the high-side switching device Q2 is the waveform of the resonant current generated between the resonant inductor Lr and the resonant capacitor Cr. At this time, the excitation energy of the transformer T is transmitted to the secondary side and an excitation current im decreases linearly or substantially linearly. Thus, a current is that flows through the diode Do on the secondary side is analogous to a resonant current iqd2 subtracted by the linearly or substantially linearly decreasing excitation current im. As a result, the current is rises relatively steeply from substantially zero, producing a waveform substantially having the curve of a sine wave, and drops towards substantially zero after reaching a peak point at which the rate of change of the current becomes substantially zero. When the excitation current im of the transformer T becomes substantially zero, the diode Do is turned off and the secondary current is becomes substantially zero.

On the primary side of the transformer T, when the voltage across the charged capacitor C2 reaches the threshold voltage between the base and emitter of the transistor Q3, the transistor Q3 is turned on. As a result, the voltage between the gate and source of the high-side switching device Q2 becomes substantially zero, such that the high-side switching device Q2 is turned off at a substantially zero current at time t4 and a zero current switching (ZCS) operation is performed. When the high-side switching device Q2 is turned off, a reverse bias is applied to the diode Do on the secondary side and the voltage across the winding of the transformer T starts to reverse.

Here, the timing at which the excitation current im becomes substantially zero and the timing at which the high-side switching device Q2 is turned off changes in accordance with the load connected to the output terminals. In other words, when the load is light, the high-side switching device Q2 is turned off and a reverse voltage is applied to the diode Do after the excitation current im has become substantially zero, whereas when the load is heavy, the excitation current im becomes substantially zero and a reverse voltage is applied to the diode Do after the high-side switching device Q2 has been turned off. That is, in either of the loading conditions, a reverse voltage is applied to the diode Do and a transition to state 4 occurs at time t4 at which both the high-side switching device Q2 and the diode Do are turned off.

In this manner, the ON period of the high-side switching device Q2 in state 3 is determined by the charging current D. For example, when the voltage across the capacitor C1 is high, the charging current D is increased, and the time elapsed before the voltage across the capacitor C2 reaches the threshold voltage between the base and emitter of the transistor Q3 becomes short, such that the ON period of the high-side switching device Q2 becomes short. The voltage across the capacitor C1 is determined by the input voltage Vi and the ON period of the low-side switching device Q1. The low-side control circuit 81 decreases the ON period of the low-side switching device Q1 when the input voltage Vi is high, and increases the ON period of the low-side switching device Q1 when the input voltage Vi is low. Thus, the ON period of the low-side switching device Q1 is adjusted in accordance with variations in the input voltage Vi, and the ON period of the high-side switching device Q2 is controlled accordingly.

In state 4, the body diode of the low-side switching device Q1 is brought into conduction, and a current iqd1 flows in the negative direction through the low-side switching device Q1. At this time, the low-side control circuit 81, which has detected the voltage polarity inversion of the transformer T using the low-side drive winding nb1, applies a voltage to the gate terminal of the low-side switching device Q1 slightly later than time t4, and the low-side switching device Q1 is turned on at time t5. In this manner, a zero voltage switching operation is performed and state 4 ends.

The above-operations are performed in the single switching period Ts, and continue to be performed in subsequent switching periods.

As a result of the operations described above, during the ON period of the low-side switching device Q1, excitation energy is stored in the primary winding np of the transformer T and electrostatic energy is stored in the resonant capacitor Cr. When the low-side switching device Q1 is turned off, since the excitation energy and electrostatic energy are released to the secondary side of the transformer T, the peak current is decreased and conduction loss is reduced, as compared to an apparatus in which only excitation energy is stored during the ON period of the low-side switching device Q1 and this excitation energy is released during the OFF period of the low-side switching device Q1.

The ON period of the high-side switching device Q2 is determined in accordance with the voltage across the capacitor C2, i.e., the ON period of the low-side switching device Q1. The ON period of the low-side switching device Q1 is determined by the low-side control circuit 81 in accordance with the input voltage Vi. Thus, the switching power supply apparatus 101 appropriately controls the ON period of the high-side switching device Q2 even when the input voltage Vi varies, such that the power factor is improved.

Further, by using the Zener diode Dz2 in the discharging circuit to discharge the capacitor C2 in association with the switching control of the low-side switching device Q1, as compared to the case in which only a resistor is used, the amount of change in the discharging current B of the capacitor C2 corresponding to the amount of variation in the input voltage Vi is increased, and the amount of change in the discharging period of the capacitor C2 is increased. Thus, a larger amount of variation in the input voltage Vi is permissible.

Figure 3:
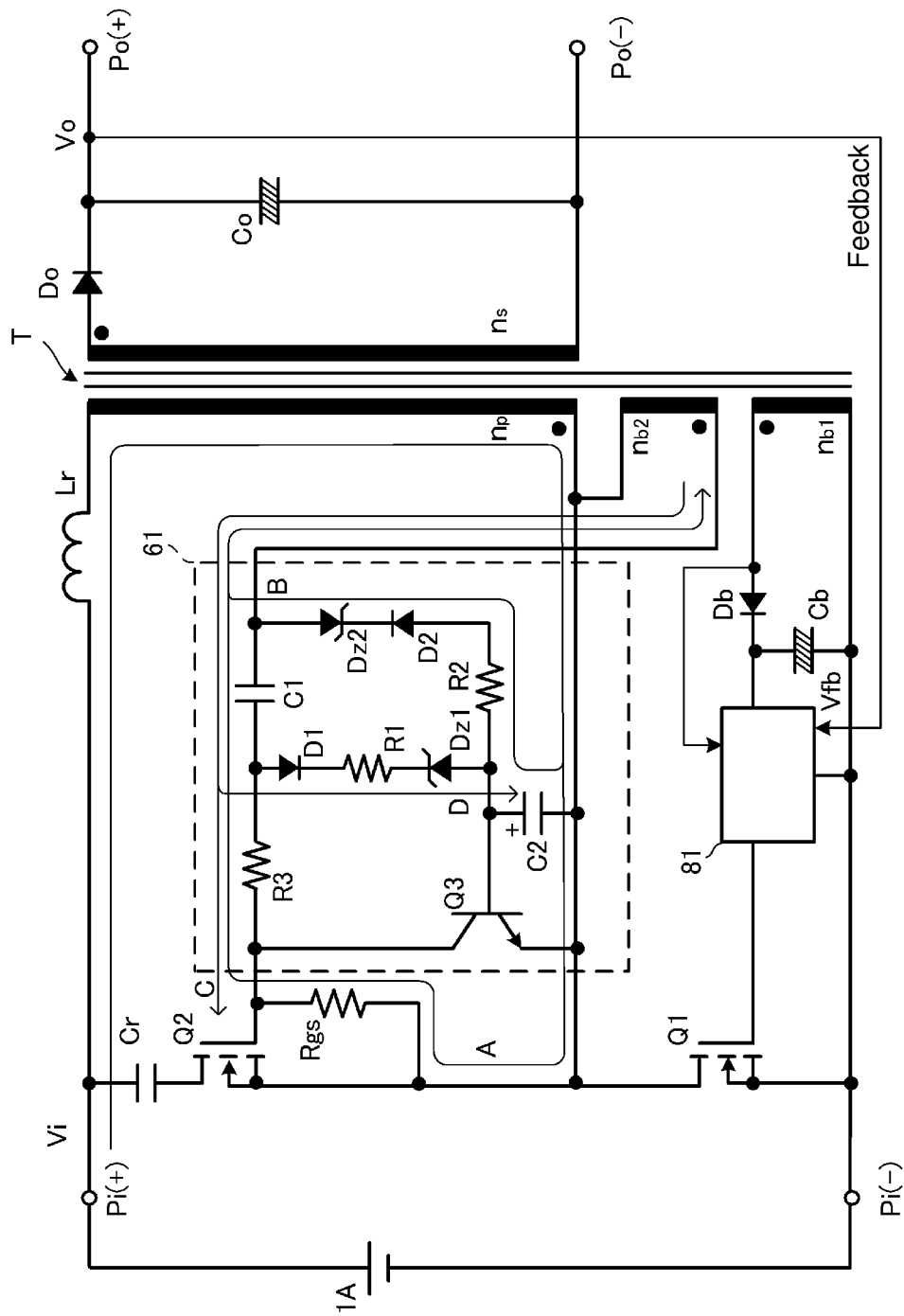
FIG. 3 is a circuit diagram of a switching power supply apparatus which uses a DC input power supply.

Note that the switching power supply apparatus 101 can be used not only for PFC converters but also for DC-DC converters. FIG. 3 is a circuit diagram of a switching power supply apparatus which uses a DC input power supply. A DC input power supply 1A is connected between the input terminals Pi(+) and Pi(−) of a switching power supply apparatus 101A illustrated in FIG. 3. FIG. 3 is different from FIG. 1 in that a diode bridge circuit is not provided. Since the rest of the circuit is preferably the same or substantially the same as that in FIG. 1, the description thereof is omitted.

Second Preferred Embodiment

Figure 4:
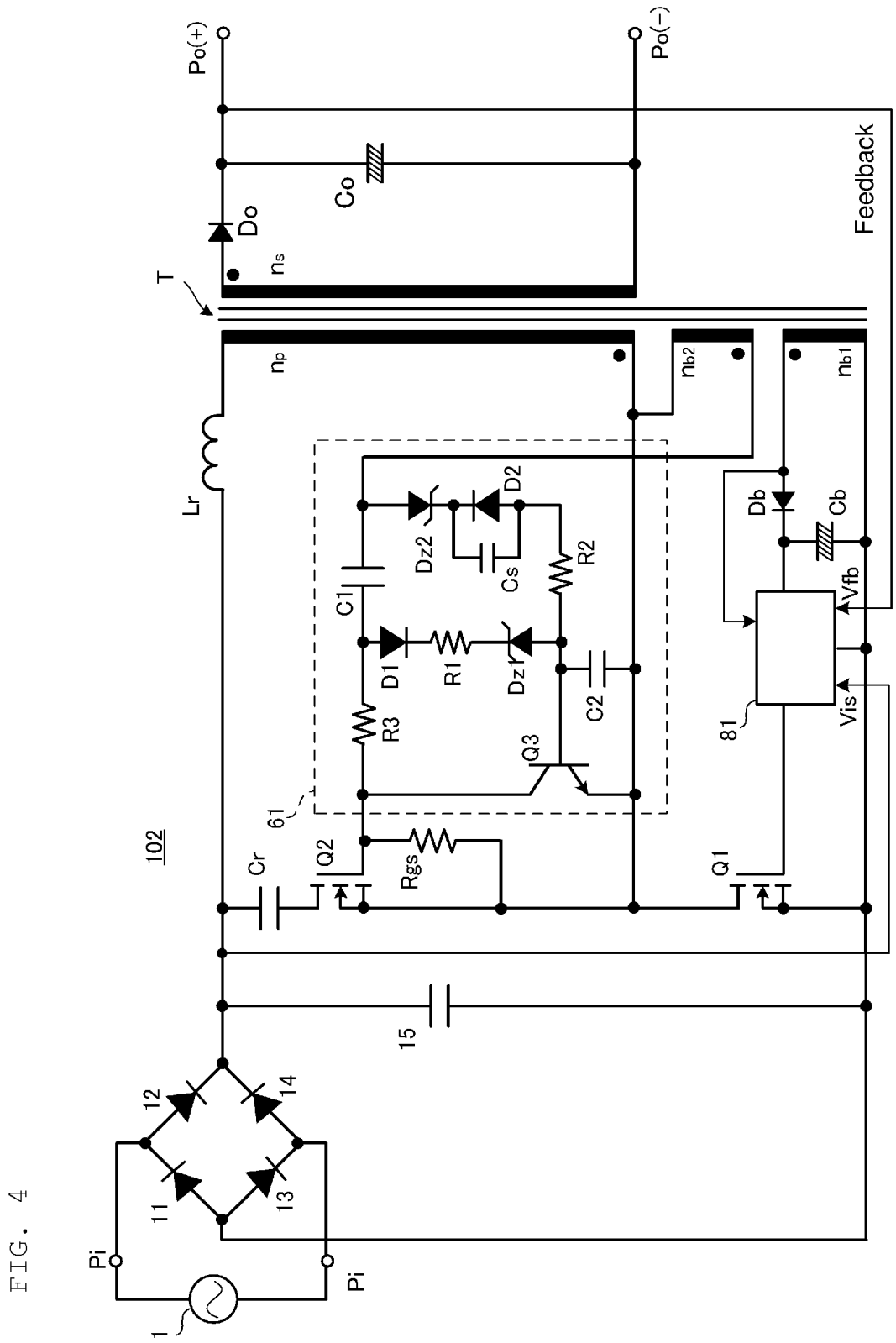
FIG. 4 is a circuit diagram of a switching power supply apparatus according to a second preferred embodiment of the present invention.

FIG. 4 is a circuit diagram of a switching power supply apparatus according to a second preferred embodiment of the present invention. Unlike the first preferred embodiment, a switching power supply apparatus 102 according to the second preferred embodiment includes a capacitor Cs (third capacitor) which is connected in parallel with the diode D2 in the discharging circuit. The capacitor Cs preferably has a small capacitance, for example, about 100 pF, and when the capacitor C2 is charged by a voltage induced in the high-side drive winding nb2, the capacitor Cs is charged at the same time.

When the voltage polarity of the high-side drive winding nb2 is inverted and the capacitor C2 is discharged, discharging through the capacitor Cs connected in parallel is added such that the amount of discharging is increased. Thus, the charge of the capacitor C2 can be quickly discharged and the controllable ON period of the high-side switching device Q2 can be increased.

Third Preferred Embodiment

Figure 5:
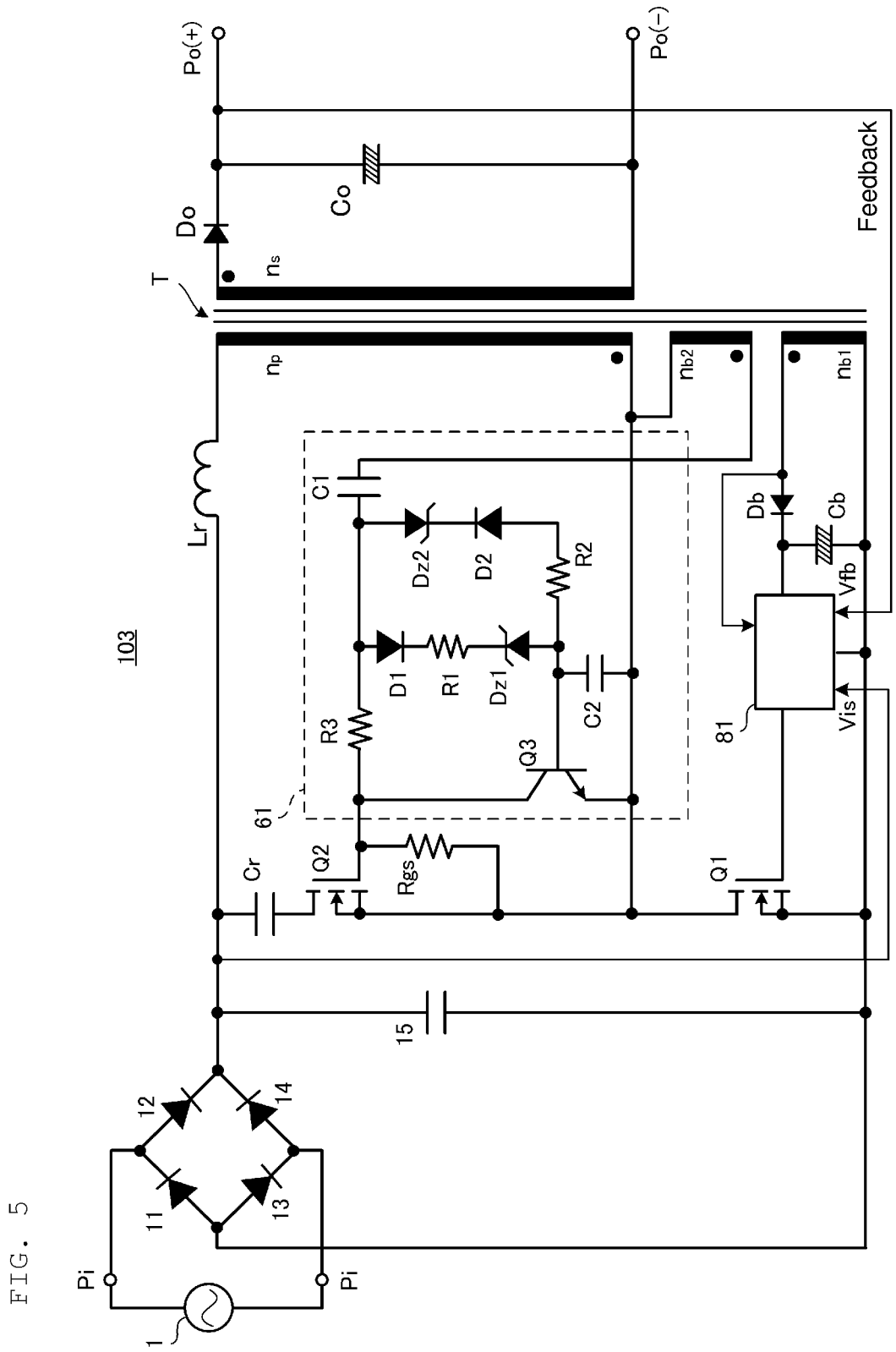
FIG. 5 is a circuit diagram of a switching power supply apparatus according to a third preferred embodiment of the present invention.

FIG. 5 is a circuit diagram of a switching power supply apparatus according to a third preferred embodiment of the present invention. A switching power supply apparatus 103 according to the third preferred embodiment is different from that of the first preferred embodiment in terms of the position of the capacitor C1. More specifically, the charging circuit and discharging circuit are preferably connected to a connection node between the resistor R3 and the capacitor C1. In other words, the discharging circuit is configured to discharge the capacitor C2 in cooperation with the capacitor C1. With this configuration, a voltage applied to the discharging circuit is decreased by a voltage corresponding to a charge stored in the capacitor C1. As a result, the breakdown voltages and loss of components, such as the resistor R2, the diode D2, and the Zener diode Dz2, for example, are reduced.

Fourth Preferred Embodiment

Figure 6:
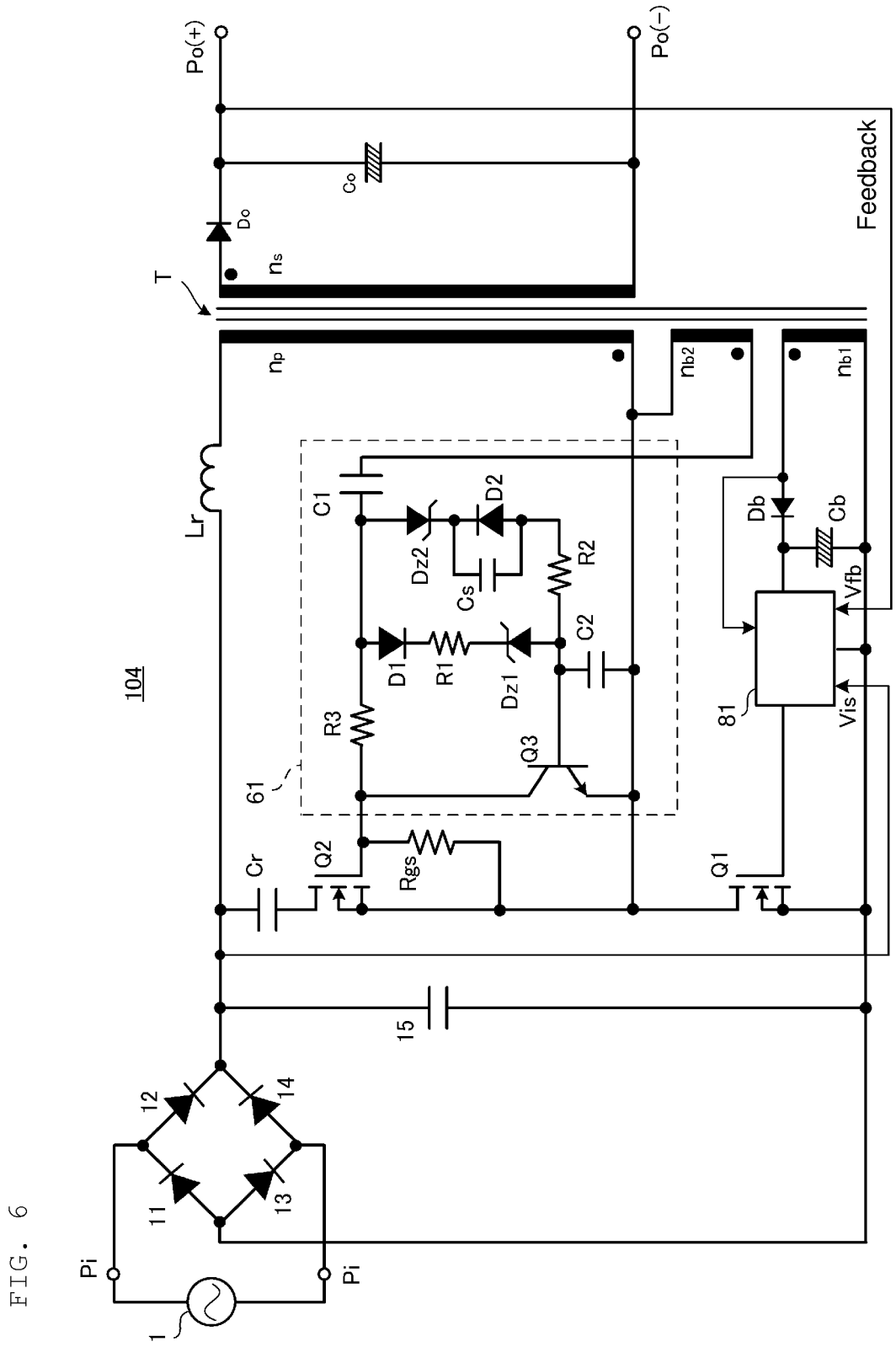
FIG. 6 is a circuit diagram of a switching power supply apparatus according to a fourth preferred embodiment of the present invention.

FIG. 6 is a circuit diagram of a switching power supply apparatus according to a fourth preferred embodiment of the present invention. A switching power supply apparatus 104 of the fourth preferred embodiment includes the capacitor Cs described in the second preferred embodiment and the capacitor C1 is preferably located at the position described in the third preferred embodiment. With this configuration, the amount of discharging of the capacitor C2 can be instantly increased. Thus, it is possible to control the amount of change in time from the turning off to the turning on of the transistor Q3, i.e., the ON period of the high-side switching device Q2. In addition, a voltage applied to the discharging circuit is decreased by a voltage corresponding to a charge stored in the capacitor C1. As a result, the breakdown voltages and losses of components, such as the resistor R2, the diode D2, and the Zener diode Dz2, for example, are reduced.

Note that the design of, for example, the specific configuration of the switching power supply apparatus can be appropriately changed. The operations and effects described in the preferred embodiments described above are only examples of the most preferred operations and effects obtained by the present invention. The operations and effects obtained by the present invention are not limited to those described in the above-described preferred embodiments.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A switching power supply apparatus comprising:
a power supply input portion to which an input voltage is input;
a transformer including a primary winding, a secondary winding, and a drive winding magnetically coupled to one another;
a low-side switching device connected in series with the primary winding and that is turned on and off such that the input voltage is intermittently applied to the primary winding;
a resonant capacitor, a resonant inductor, and a high-side switching device connected across the primary winding so as to define a closed loop;
a first control circuit arranged to control the low-side switching device; and
a second control circuit arranged to control the high-side switching device in accordance with a voltage generated in the drive winding; wherein
the second control circuit includes:
 a first capacitor connected between the drive winding and a control terminal of the high-side switching device and charged during an ON period of the low-side switching device;
 a second capacitor connected to a connection node between the first capacitor and the drive winding;
 a charging circuit connected between the second capacitor and a connection node between the high-side switching device and the first capacitor and arranged to charge the second capacitor based on voltages of the drive winding and the first capacitor during an OFF period of the low-side switching device;
 a turn-off circuit connected to the control terminal of the high-side switching device and arranged to turn off the high-side switching device when a voltage across the second capacitor exceeds a threshold; and
 a discharging circuit connected between the second capacitor and a connection node between the high-side switching device and the drive winding and arranged to discharge the second capacitor during an ON period of the low-side switching device; and
the discharging circuit includes:
 a series circuit including a diode, a resistor, and a Zener diode; and
 a third capacitor connected in parallel with the diode.

2. The switching power supply apparatus according to claim 1, wherein
an AC input voltage is input to the power supply input portion;
the switching power supply apparatus further includes a rectifying circuit arranged to perform full-wave rectification for the AC input voltage; and
the first control circuit detects a control voltage corresponding to a voltage obtained through the full-wave rectification performed by the rectifying circuit, and controls the low-side switching device based on the control voltage.

3. The switching power supply apparatus according to claim 1, wherein the resonant inductor is defined by a leakage inductance of the transformer.

4. The switching power supply apparatus according to claim 1, wherein
the charging circuit includes a first second constant-voltage device that sets a level of a charging current to charge the second capacitor; and
the Zener diode of the discharging circuit sets a level of a discharging current to discharge the second capacitor.

5. The switching power supply apparatus according to claim 1, wherein the discharging circuit is connected between the second capacitor and a connection node between the first capacitor and the high-side switching device, and discharges the second capacitor in addition to the first capacitor.

6. The switching power supply apparatus according to claim 2, wherein the rectifying circuit is defined by a diode bridge circuit.

7. The switching power supply apparatus according to claim 6, wherein the diode bridge circuit includes a plurality of diodes and a filter capacitor connected between input terminals of the switching power supply apparatus.

8. The switching power supply apparatus according to claim 1, wherein the primary winding of the transformer and the low-side switching device are connected in series with one another.

9. The switching power supply apparatus according to claim 1, wherein the low-side switching device is an n-type FET, a drain terminal of the n-type FET is connected to the primary winding of the transformer, and a source terminal of the n-type FET is connected to a ground line.

10. The switching power supply apparatus according to claim 1, wherein the high-side switching device is an n-type FET, a source terminal of the n-type FET is connected to a connection node between the high-side switching device and the primary winding of the transformer.

11. The switching power supply apparatus according to claim 1, wherein a half-wave rectifying and smoothing circuit is provided between two ends of the secondary winding of the transformer.

12. The switching power supply apparatus according to claim 11, wherein the half-wave rectifying and smoothing circuit includes a diode and a capacitor.

13. The switching power supply apparatus according to claim 1, wherein the transformer includes a low-side drive winding and a high-side drive winding on a primary side thereof.

14. The switching power supply apparatus according to claim 13, wherein the first control circuit is connected to the low-side drive winding.

15. The switching power supply apparatus according to claim 14, wherein a rectifying and smoothing circuit is connected between the low-side drive winding and the first control circuit.

16. The switching power supply apparatus according to claim 15, wherein the rectifying and smoothing circuit includes a diode and a capacitor.

17. The switching power supply apparatus according to claim 13, wherein a first end of the high-side drive winding is connected to a connection node between the low-side switching device and the high-side switching device.

18. The switching power supply apparatus according to claim 13, wherein a second end of the high-side drive winding is connected to a gate terminal of the high-side switching device through the second control circuit.

* * * * *